United States Patent [19]

Iuchi

[11] Patent Number: 4,699,194
[45] Date of Patent: Oct. 13, 1987

[54] PNEUMATIC RADIAL TIRES FOR HEAVY VEHICLES

[75] Inventor: Munenori Iuchi, Fukushima, Japan

[73] Assignee: Sumitomo Rubber Industries, Ltd., Japan

[21] Appl. No.: 748,780

[22] Filed: Jun. 26, 1985

[51] Int. Cl.⁴ .............................................. B60C 15/06
[52] U.S. Cl. .................................... 152/543; 152/541; 152/546; 152/547; 152/554
[58] Field of Search ................ 152/539, 540, 543, 546, 152/548, 552, 541, 554, 542, 547

[56] References Cited

U.S. PATENT DOCUMENTS

| | | | |
|---|---|---|---|
| 3,789,900 | 2/1974 | Verdier | 152/548 |
| 3,964,533 | 6/1976 | Arimura et al. | 152/543 X |
| 4,100,955 | 7/1978 | Pottinger et al. | 152/543 X |
| 4,215,737 | 8/1980 | Motomura et al. | 152/543 X |
| 4,234,029 | 11/1980 | Peter et al. | 152/543 X |
| 4,319,622 | 3/1982 | Iuchi et al. | 152/540 |
| 4,342,353 | 8/1982 | Tamura et al. | 152/546 X |
| 4,352,383 | 10/1982 | Matsumoto et al. | 152/554 X |

FOREIGN PATENT DOCUMENTS

| | | | |
|---|---|---|---|
| 53-102502 | 9/1978 | Japan . | |
| 55-106805 | 8/1980 | Japan | 152/543 |
| 55-106807 | 8/1980 | Japan | 152/543 |
| 55-106808 | 8/1980 | Japan | 152/546 |
| 56-25006 | 3/1981 | Japan | 152/543 |
| 57-8725 | 2/1982 | Japan . | |
| 55-109406 | 6/1984 | Japan | 152/543 |

Primary Examiner—Donald E. Czaja
Assistant Examiner—Ramon R. Hoch
Attorney, Agent, or Firm—Stevens, Davis, Miller & Mosher

[57] ABSTRACT

A pneumatic radial type tire for heavy vehicles having improved durability in its bead section. This tire comprises at least one carcass ply of metallic cords arranged in a substantially radial direction of the tire, at least one chafer of rubberized metallic cords disposed at the outside of the turn-up portion of the carcass ply, one carcass reinforcing member of rubberized metallic cords secured to the inner surface of the carcass ply main portion in the bead section with respect to the axial direction of the tire, which is crossed with the carcass ply cords at an angle of 10°–50°. A portion of the carcass reinforcing member is interposed by a given width between the inner turn-up portion of the aforesaid metallic cord chafer and the carcass ply main portion at the axial inner side of the bead core, a buffer of a composite soft rubber stock with JIS hardness of 45 to 65 is disposed on the bead core between the carcass ply and its turn-up portion and extends outwardly gradually decreasing in thickness to form a substantially triangular section in the radial direction of the tire.

12 Claims, 6 Drawing Figures

(10.00R 20.0 14PR)

(12.00R 22.5 14PR)

PNEUMATIC RADIAL TIRES FOR HEAVY VEHICLES

BACKGROUND OF THE INVENTION

1. Field of the Invention

The present invention is directed to an improvement in large size tires for trucks and other heavy vehicles, and more particularly to an imporvement of a structure for reinforcing bead sections of such tires.

2. Description of the Prior Art

In general, a tire of this type comprises, as shown in FIG. 1, a carcass 2 of a single ply arranged in a substantially radial direction of the tire or semi-radial tire, wherein a carcass ply forms a small angle of 10°–20°, or at most an angle of less than 30°, with respect to the mid-circumferential plane of the tire and is provided with a hard rubber stock 11 (see FIG. 1) with JIS hardness greater than 80, and a relatively soft rubber stock 12 with JIS hardness of about 50 to 60, disposed above a bead core 3 between the carcass main portion 2 and the turn-up portion 2' of the carcass ply 2.

DETAILED DESCRIPTION OF THE INVENTION

Radial and semi-radial tires have a carcass of a single ply composed of radially directed cords. As a result, the side wall of a radial tire is extremely soft, and hence its flexure in the direction of the rotary axis of the tire is very large. Thus, the amount of deformation of the tire during one rotation is far larger than that of the bias tire. That is, the bead section of the said tire is strongly forced to deform over the rim flange, like a convex surface under the influence of such soft sidewalls, contributing to their temperature increase. It has been found by the inventors that the internal temperature of the bead section may increase up to 120°–170° C. by this heat and by the transmission of temperature from the brake drum of vehicles.

Thus, the bead section suffer from dynamic fatigue and thermal fatigue. Furthermore, unfortunately, the adhesion of the rubber with metallic cords or fiber cords, which is vital to the maintenance of tire performance, is largely influenced and detrimentally influenced by this dynamic and thermal fatigue when the internal temperature of the tire is increased. These types of radial tires can be repeatedly used by recapping the tire treads several times, and this recapping is regarded as a sales point for steel radial tires. This recapability depends on the durability of the bead section. The above-described known tires do not always satisfy the requirement of a durable bead section. On the other hand, these tires have been used under heavy loads and severe conditions and frequently used under more severe than usual conditions to economize on operating costs. Therefore, improvement of the durability of the bead sections is needed.

To illustrate the improper action of an overheated tire, FIG. 3 shows that when a tire with a bead section as shown in FIG. 2 is inflated, carcass ply 2, which is turned up around a bead core 3, moves upwardly, as shown by an arrow, and turn-up portion 2' of a carcass ply 2 in the outside of the bead core 3 moves downwardly, as shown by an arrow, thus tending to disengage the carcass ply from the bead core 3. The turn-up portion 2' of the carcass ply 2 causes metallic cord reinforcing layer 4 and the organic fiber cord reinforcing layers 6 to move downwardly also.

The bead core 3 likewise tends to rotate about its own axis, as shown by an arrow in FIG. 3. In addition, the deformation of the tire when it is inflated causes a shearing strain to be produced among those components.

When the adhesion among these layers is unable to endure the imposed strain, the carcass ply 2 pulls out of the bead core 3, this phenomenon will hereinafter be referred to as "blow out" for the sake of convenience.

This "blow-out" phenomenon is apt to occur owing to the said internal temperature and, the higher the temperature, the earlier it occurs.

The inventors have made various investigations with respect to the aforementioned internal temperature and strain in the bead section in order to provide a tire having an improved durability in bead reinforcing structure and found the following facts: in a structure having at least two reinforcing organic fiber layers arranged outside the aforementioned metallic cord reinforcing chafer (see FIG. 2) (as proposed in Japanese Pat. No. 567,452), the bead part is made thick, heat is apt to be generated under a high load, and the strain imposed on the bead section itself increases. As a result, the cord ends of the reinforcing fiber layers themselves are apt to form the nucleus for causing separation due to concentration of stress in conjunction with the cord ends of the carcass ply and the metallic cord reinforcing chafer, and the organic fiber cords in the reinforcing layers are sometimes broken, depending on its arranged angle which causes it to undergo large lateral deflection, and the cut ends are apt to become a nucleus for causing separation in the bead sections.

Against this background, the object of this invention is to provide a highly durable reinforced construction of the bead portions of large size radial tires for trucks and other heavy vehicles which can effectively avoid the difficult problem which has been encountered with the above prior art techniques, that is, which are resistant to use under very heavy load conditions and which can be recapped two or three times without damaging the base tire. This is done by means of decreasing the arrangement of the reinforcing member, causing the separation at the outside of the bead core as far as possible, to decrease the heat generation at the bead section as far as possible, to give effective and full reinforcing effect to the bead section and to increase the durability of the bead section necessary under the particularly severe service conditions, whereby the tire can be reused by recapping with a new tread.

DISCLOSURE OF THE INVENTION

The present invention is directed to a pneumatic radial type tire having improved durability in the bead sections, comprising at least one carcass ply composed of metallic cords in a substantially radial arrangement and turned up outwardly of the tire around a bead core and a bead reinforcing structure, inclusive of at least one chafer 4 composed of rubberized metallic cords and arranged radially inwardly of and along and adjacent to the turn-up portion 2' of the carcass ply 2. The tire further comprises a carcass reinforcing member 6 composed of one rubberized metallic cord layer secured to the inside of the carcass ply main portion 2, with respect to the bead core, the cords being crossed with each other in their rubber coating surface and overlapping by a given width 1 with the inner side portion 4' of the metallic cord chafer 4. The carcass ply 2 is folded around the bead base, at the outside of the axial direction of the bead core 3 to the vertical height $h_1$ of the outermost end $2a$ of the turn-up portion $2'$ of the carcass ply 2. From the bead base, it is higher than the vertical height $h_2$ of the outermost end $4a$ of metallic cord chafer 4 from the bead base, that is, $h_1 > h_2$. The metallic cord chafer 4 is arranged radially inwardly of, and along and adjacent to, the turn up portion $2'$ of the carcass ply 2 from the height $h_2$, is folded inwardly around the bead base in the axial direction, and terminated at the position of the height $h_4$ from the bead base. The aforesaid carcass reinforcing member 6, composed of rubberized metallic cords, is arranged along the inside of the carcass ply 2 from the vertical height $h_3$, extending radially inwardly to the position of vertical height $h_5$ from the bead base. The inward end $6b$ in the radial direction of the carcass reinforcing member 6 must be extended to the position where said end $6b$ is interposed by a given width 1 between the inward turned-up portion $4'$ of the metallic cord reinforcing chafer 4 and the carcass ply main portion 2 at the inside of the bead base, and the relation of $h_3 > h_4$ must be satisfied. A relatively soft rubber stock is disposed between the carcass ply and its turn-up portion and extending outwardly from the vicinity of the bead core beyond the outermost cord ends of the turn-up portion, and of the metallic cord reinforcing chafer in the radial direction of the tire.

The invention will now be described in greater detail with reference to the accompanying drawings, wherein:

DETAILED DESCRIPTION OF THE DRAWINGS

Figure 4:
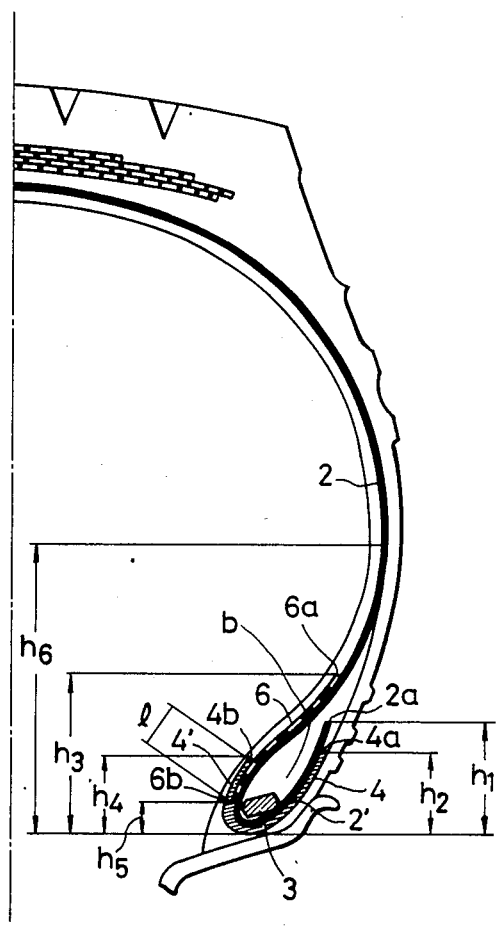
FIG. 4 shows a cross-sectional view of a portion of a tire of an embodiment of the pneumatic radial tire for heavy loads according to the invention.

Turning now to the drawings in greater detail, in FIG. 4, 1 represents a tire, 2 is a carcass ply main portion, $2'$ is a turn up portion of the carcass ply, $2a$ is an outermost end of a turn-up carcass ply cord, 3 is a bead core, 4 is a reinforcing layer (chafer) composed of rubberized metallic cords, $4'$ is an inward turn-up portion of the matallic cord chafer 4, $4b$ is the upper end of the inward turn-up portion $4'$ of the metallic cord chafer 4, 6 is a carcass reinforcing member composed of rubberized metallic cord, $6a$ is the upper end of the carcass reinforcing member 6, $6b$ is the lowermost end of the carcass reinforcing member 6, and b is a buffer composed of a composite soft rubber stock.

The special buffer b is placed between the carcass ply 2 and its turn-up portion $2'$ and is composed of a relatively soft single rubber stock with JIS hardness of 50 to 60, and extends upwardly from the bead core in the radial direction of the tire and gradually decreases in thickness towards the side wall of the tire and beyond an end portion $2a$ of the carcass ply turn-up portion $2'$.

Therefore, under nominal inflation pressure the bead section is forced to the associate rim flange so that the thick base portion of the buffer (comprised of soft rubber stock) is pressed between the carcass ply 2 and its turn-up portion $2'$, and is apt to be pushed out of the bead section toward the side wall. As a result, a distortion in the radial direction of the tire is caused at end $2a$ of the turn-up portion $2'$ and end $4a$ of the metallic cord chafer 4, tending to separate these ends from the rubber. Furthermore, a distortion in the circumferential direction of the tire is caused between the cords of the carcass ply 2 at the contact area of the tire with the road by the deformation of the side wall. In addition to these distortions, the tire is exposed to various severe conditions, such as bending and other distortions, during the rotation of the tire, and particularly the upper end $4a$ of the metallic cord chafer 4 located at a portion remote from the bead base part is strongly subjected to the distortion in circumferential direction of the tire. As a result, a separation of the cords from the rubber may be caused early in the tire life.

Therefore, the inventors have made various investigations for improving the durability of the bead section, and it has been found that by making the upper end $4a$ of the chafer 4 lower (that is radially shorter) than the turn-up carcass ply end $2a$, the strain at the upper end of the chafer which has been the cause of the bead failure becomes smaller and generation of bead failure is greatly decreased. But, by lowering the radial height of the chafer, the deformation of the bead section becomes larger and remains an important heat generation factor in the bead section. It has been found that in order to solve these problems while maintaining the merit of the above-described structure, and to restrain the deformation of the bead section having a close relation to the heat generation in the bead section, a carcass reinforcing member 6, composed of rubberized metallic cords, is disposed adjacent and along the carcass ply main portion 2 inside the bead core 3. The inward end portion $6b$ of the carcass reinforcing member 6 is interposed between the carcass ply 2 and the inward turn-up portion $4'$ of the metallic cord chafer 4 at the inside of the axial direction of the bead core 3, and the carcass reinforcing member 6 is disposed along the carcass main portion 2 over the circular region of the radial height $h_3$ of its upper end $6a$ of 0.7 to 1.3 times as high as the height $h_1$ of the upper end $2a$ of the turn-up portion $2'$ of the carcass ply 2, and is crossed with the carcass ply 2 at an angle of 10°–50°, preferably 20°–40°, near the position of the point, crossing to the axial direction line passing the height $h_4$ of the inward turn-up cord end $4b$ of the metallic cord chafer 4 wound around the bead base. The higher the height $h_3$, the more preferably in order to prevent stress concentration on the upper end $2a$ of the turn-up portion $2'$ of the carcass ply 2 and the higher the casing strength.

However, when the height $h_3$ of the upper end $6a$ in the radial direction is more than 1.3 $h_1$, the effect for preventing the divergence of the carcass ply 2 becomes constant, while when said cross angle is more than 50°, the effect for preventing the "blow out behavior" is small and, further, there is a problem in production. When the height $h_3$ is less than 0.7 $h_1$, the effect for preventing "blow out behavior" becomes very small. Furthermore, by positioning the carcass reinforcing member 6 on the carcass ply 2 in this manner, such another effect is expected as the stress concentration on the inwardly turn-up cord end $4b$ of the metallic cord chafer 4 and the separation of a boundary between the carcass ply 2 and the inwardly turned up cord end $4b$ of the metallic cord chafer 4 can be most effectively prevented.

It is an important aspect of this invention to fulfill the aforesaid effect that the radial inward cord end 6b of the carcass reinforcing member 6 is terminated at the position of the radial height $h_5$ from the bead base on an axial inside of the bead core of the tire, and the structure, in which the inward portion of the carcass reinforcing member 6 is interposed by the given length l between the carcass ply 2 and the inwardly turned-up portion 4' of the metallic cord chafer 4, is adopted.

There is a more important factor with respect to the arrangement of the cord angle of the carcass reinforcing member 6, when the cord angle at which the turn-up portion 2' of the carcass ply 2 crosses the metallic cord chafer 4 is 40°–80°, while tending to be higher toward the right in view from the outside of the axial direction of the tire near the position of the height $h_4$ from the bead base, its turn-up portion 4' at the inside of the bead core is to have the angle of 40°–80°, while inclining to be higher toward the left, and in order to fulfill the aforesaid effect by the carcass reinforcing member 6, its cord angle must be arranged at 10°–50°, preferably 20°–40°, while inclining to be higher toward the right. It has been confirmed by the inventors through various repeated fleet tests that the "blow out behavior" is effectively prevented by arranging the reinforcing member 6 to the carcass ply 2 in the aforesaid manner. The height $h_4$ of the upper end 4b of the inner turn-up portion 4' of the metallic cord chafer 4 is preferred to be 0.5–0.8 times as high as the height $h_3$ of the carcass reinforcing member 6 from the standpoint to alleviate the strain arising at the boundaries among reinforcing components by maintaining the appropriate overlapping zone l with the carcass reinforcing member 6. When the height $h_4$ is lower than 0.5 $h_3$, the width l of the aforesaid overlapped zone becomes narrower to reduce the strain distribution and lateral stability.

On the other hand, the upper end 4b of the metallic cord chafer 4, which is axially inside the bead core 3, is disposed in relation to the inward end 6b of the carcass reinforcing member 6 so that it is not preferable to make the height $h_4$ higher than 0.8 $h_3$, the inward limit in the radial direction of the carcass reinforcing member 6 is to be terminated at the height of 10–15 mm from the bead base. This is because the stress concentration on the core ends is so small and so stable that the dynamic strain is very small at the inside of a bead core and has high rigidity. It is preferable that the height $h_1$ of the upper end 2a of the turn-up portion 2' of the carcass ply 2 is 0.3–0.5 times as high as the height $h_6$, which is the position at which the section width is maximum when the tire is inflated in the radial direction perpendicular height from the bead base. When the height $h_1$ is less than 0.3 $h_6$, the rigidity of the bead section is lower and the resistance to wear of the bead section due to the friction with the rim also lowers, and there is a risk of the carcass ply 2 slipping out of the bead core 3 because the turn-up portion 2' is short and the bonding area with other components also is deficient. On the contrary, when the height $h_1$ is more than 0.5 $h_6$, the upper end 2a is extended up to near the maximum width portion, at which the flexure is most severe.

The nucleus of crack generates at the upper end of the turn-up portion of the carcass ply, where the difference of rigidity becomes large in the bead section under load, and the upper end 2a is liable to be subjected to separation failure. Accordingly, the height $h_1$ of the turn-up portion is preferred to be 0.3 to 0.5 times as high as the height $h_6$. The above-mentioned fact is confirmed too by measuring of the resistance to the "blow out behavior" and the "strain of the cord end". At the same time, it is preferable that the height $h_2$ of the upper end 4a of the metallic cord chafer 4 from the bead base is 0.7–0.9 times as high as the height $h_1$ of the upper end 2a of the turn-up portion 2' of the carcass ply 2.

Figure 2:
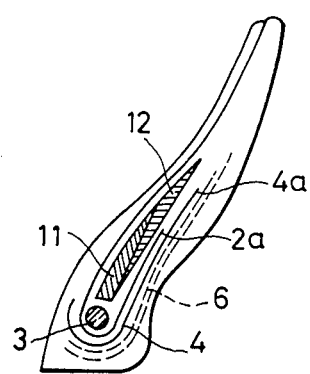
Figure 3:
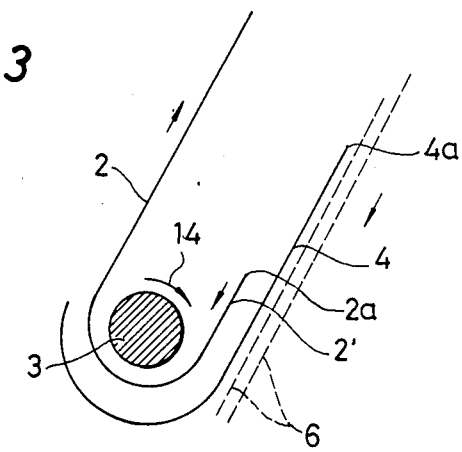
FIG. 3 is a schematic view illustrating a dislocating direction of reinforcing components in bead section when a radial tire, as shown in FIG. 2, is inflated.

The upper end 4a in the radial direction of the chafer composed of the metallic cords in the bead structure of the conventional tires, as shown in FIG. 2, is higher than the turn-up carcass ply end 2a. However, the bead failures have frequently occured at the position which the upper end 4a of the metallic cord reinforcing chafer 4 is located, then, the inventors studied the cause of the bead failure at the said position and confirmed by many experiments that the upper end of the metallic cord reinforcing chafer 4 is likely to function as the resistant layer having a high bending rigidity to the transmission of deflection from the side wall to the bead portion, which is repeated every revolution under load. As a result, the rubber at the cut end of each metallic cord is broken down and caused to separate from the cord. Furthermore, the higher the position of the upper end of the metallic cord reinforcing chafer, the earlier the separation between the cord end and the rubber occurs.

Then, the inventors have found that by making the height $h_2$ of the upper end 4a of the metallic cord chafer 4 lower than the height $h_1$ of the upper end 2a of the turn-up portion 2' of the carcass ply 2, namely $h_2 = (0.7-0.9)h_1$, the aforesaid failure in the bead section is greatly decreased.

When the height $h_2$ is less than the height of 0.7 $h_1$, the rigidity of the bead section also lowers and the resistance to wear of the bead section due to friction with the rim and to the casing failure under the severe load also lowers. On the contrary, when the height $h_2$ is in the range of a radial height of 0.9 to 1.0 times, both the upper end 2a of the turn-up portion 2' and the upper end 4a of the chafer 4 are overlapped with each other, and the stress concentration is doubled thereon, so that problems are earlier generated. Therefore, the range of the height $h_2$ of the upper end 2a of the chafer is preferred to be 0.7 to 0.9 times as high as the height $h_1$ of the upper end 2a of the turn-up portion 2' of the carcass ply 2.

The metallic cord chafer 4 is arranged from the height $h_2$ outside the turn-up portion 2' of the carcass ply 2 and turned around the bead base from the outside toward the inside thereof to form the inner turn-up portion 4', and the upper end 4b of the inner turn-up portion 4' of the metallic cord chafer 4 is terminated at the height $h_4$ ($h_2 > h_4$). The reinforcing member 6 of the carcass ply 2, of which the inward end 6b in the radial direction is interposed between the carcass ply 2 and the said turn-up portion 4' of the metallic cord chafer 4 is arranged from the height $h_3$ along the inside of the ply cord of the carcass main portion and crossed with the ply cord at an angle of 10°–50°, more preferably 20°–40°, near the position of the aforesaid height $h_4$, and its inward end 6b is terminated at the height $h_5$ at the inside of the bead core 3.

A rubber buffer b, having a substantially triangular cross-sectional shape which is disposed above bead core 3, between the carcass ply 2 and the turn-up portion 2' thereof and extends from the upper end of the bead core 3 outwardly in the radial direction of the tire, is composed of a single soft rubber composite with a JIS hardness of 45°–65° and 10–45 kg/cm² at 100% modulus, so as to lead to the below additional advantage in the improvement of durability in the bead section, as discussed below.

Figure 1:
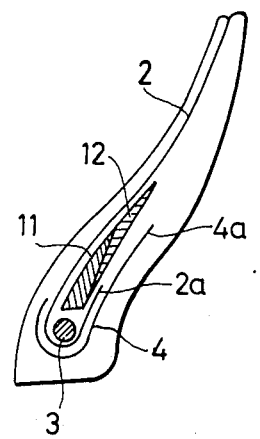
FIGS. 1 and 2 are cross-sectional views of a bead section of the aforesaid prior art.

That is, in the prior art, as shown in FIGS. 1 and 2, the stiffener comprises a composite stiffener composed of a half of a lower rubber stock 11 having a relatively high hardness, and a half of an upper rubber stock 12 having a relatively low hardness, or the stiffener is composed of a single rubber stock having a higher hardness of shore hardness of 70°–85°, in order to make the rigidity in the bead section higher and to restrain the deformation of the bead section, which has a close relation with the resistance to wear of the bead section due to friction with the rim.

However, according to the invention, the deformation of the bead section can be made so small by arranging the carcass reinforcing member 6 to be interposed between the inside portion 4' of the metallic cord chafer 4 and the carcass ply main portion 2 in the aforesaid manner that there is no need to use the hard rubber stock which is apt to induce heat generation to stiffen the bead section, like in the prior art. The deformation in the radial direction and in the circumferential direction can be effectively prevented, and the stress and strain can be broadly dispersed to recover the original state, and a soft rubber stock having a low heat generation can be used as the triangular apex in a single rubber layer.

It is natural that the apex, as shown in the prior art, can be effectively applied to the reinforcing structure at the bead section, which the present invention proposes.

Especially when the present invention is applied to a tubeless tire having 15° tapered bead seat, rim matching by the inner pressure and rim fitting works are effectively practiced.

As previously mentioned, it is an important feature of the invention to arrange the carcass reinforcing member, composed of metallic cords, along the inside of the carcass main portion in the axial direction of the bead core and crossing with each other at an angle of 10°–50° with respect to the carcass ply cord, and the inward portion of the carcass reinforcing member in the radial direction interposed between the carcass main portion and the inward turned up portion of the metallic cord chafer by a given range with crossing each other. By adopting the aforementioned structure, the durability of the bead sections is greatly improved, because the dispersion of the stress which is transmitted by the carcass ply through bead cores to the wheel flange is distributed to a relatively large area during every revolution of the wheel.

In addition, the coating rubber of the carcass ply cord, the metallic cord chafer, and the carcass reinforcing member must have an excellent adhesive force in the state of both static and dynamic conditions, and an excellent resistance to boundary fatigue. As the buffer rubber in the triangular apex section can be made from soft rubber stock with JIS hardness of 45°–65° and having a low 100% modulus of elasticity of 10 to 45 kg/cm², and be made of one integral rubber piece, the generation of internal temperature in the bead sections is controlled to be lower than a conventional tire, the durability of the bead section can be considerably improved so as to provide such tire with the ability to be recapped two or three times.

The effect of the invention will be described with reference to the comparison test of the tires having the above-described reinforcing bead structure, shown in Table 1, with the conventional tire having the same construction, except for the bead structure as shown in FIG. 2, according to Japanese Pat. No. 52-11481, on a tire of the size 10.0 PR20, 14 PR, and 12 R 22.5, 14 PR.

Figure 5A:
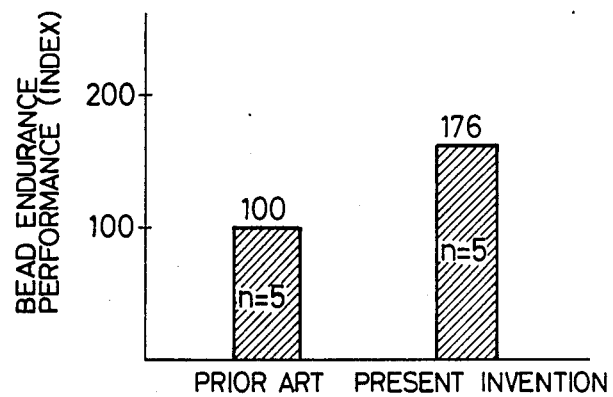
FIG. 5 is a diagrammatical view showing the results of a drum durability test.
Figure 5B:
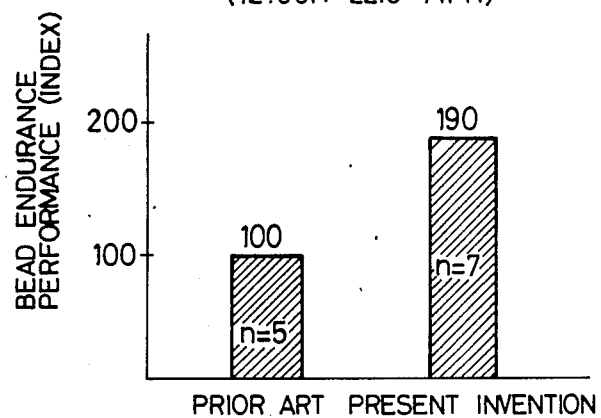

In this test, the tire to be tested is run on a steel drum under constant work Q (load × speed) kg.km/H and normal internal pressure, during which the bead durability (running time until the bead portion is damaged), is measured to obtain results, as shown in FIG. 5, wherein the performance is expressed by an index on the basis that the conventional tire of FIG. 2 is 100.

The results of the drum durability test confirmed that the tire of the present invention has excellent durability in the bead section. In addition, the fleet tests under varied service conditions were carried out, and the results of this test show that the tire of the present invention has few of the previously discussed problems, even under severe use conditions, and has excellent durability in the bead section.

It was also confirmed by these tests that the tire of the present invention is better than the conventional tire in respect of ease in setting the rim on the tire and of rim matching.

TABLE 1

| Construction | Sizes | |
|---|---|---|
| | 10.00R20 14PR with Tube | 12R22.5 14PR 15° Taper Tubeless |
| Metallic cord chafer (4) | | |
| Height $h_2$ of the upper end (4a) | 57 | 30 |
| Height $h_4$ of the inner turnup portion (4') | 53 | 35 |
| Cord angel* | 60° | 60° |
| 100% modulus of coating rubber | 48 kg/cm² | 48 kg/cm² |
| Carcass reinforcing member (6) | | |
| Height $h_3$ of the upper end (6a) | 82 | 52 |
| Height $h_5$ of the lower end (6b) | 10 | 10 |
| 100% modulus of coating rubber | 48 kg/cm² | 48 kg/cm² |
| Cord angle* | 30° | 30° |
| Height $h_6$ at maximum section width | 137 | 114 |
| Height $h_1$ of carcass ply turnup portion 2' | 68 | 40 |
| Rubber buffer (b) | | |
| 100% modulus | 20 kg/cm² | 20 kg/cm² |
| JIS hardness | 58 | 58 |

*right up angle

I claim:
1. A reinforcing structure for bead sections of radial tires for heavy loads, comprising:
at least one carcass ply having metallic cords in a substantially radial or a semi-radial arrangement and having a main portion and a turn-up portion which is turned around a bead core from the inside to the outside of the tire to a radial height of $h_1$;
at least one reinforcing chafer of metallic cords arranged along and adjacent to the turn-up portion of the carcass ply and turned around said bead core in the same manner as said carcass ply turn-up portion, the axial outer end of said chafer extending to a radial height of $h_2$ on the axial outer side of the bead core, the perpendicular height of $h_1$ of the upper end of the turn-up portion of the carcass ply from the bead base being higher than the perpendicular height $h_2$ of the upper end of the metallic cord reinforcing chafer in the radial direction of the tire, the axial inner end of the reinforcing metallic cord chafer being disposed axially inwardly of the carcass ply and around the bead core to a position of a height $h_4$ axially inwardly of the bead core; and a carcass reinforcing member of metallic cords disposed solely along the axial inside of the carcass ply main portion, extending from a height $h_3$ in the radial direction from the bead base to a height $h_5$ to its inward end, of which a radial inward portion thereof is interposed between the carcass ply main portion and the inner turn-up portion of the metallic cord chafer, with the perpendicular height of $h_3$ being greater than $h_4$ and $h_4$ being greater than $h_5$.

2. The reinforcing structure as claimed in claim 1, wherein the maximum inflated width of the tire lies at a point $h_6$ and the height $h_1$ of the turn-up portion of the carcass ply is 0.3 to 0.5 times as high as the perpendicular height $h_6$.

3. The reinforcing structure as claimed in claim 1, wherein the height $h_2$ of the upper end of the metallic cord reinforcing chafer in the radial direction is 0.7 to 0.9 times as high as the height $h_1$ of the upper end of the turn-up portion of the carcass ply.

4. The reinforcing structure as claimed in claim 1, wherein the height $h_3$ of the upper end of the carcass reinforcing member from the bead base in the radial direction is 0.7 to 1.3 times as high as the height $h_1$ of the upper end of the turn-up portion of the carcass ply in the radial direction perpendicular from the bead base.

5. The reinforcing structure as claimed in claim 1, wherein the height $h_4$ of the upper end of the inward turn-up portion of the metallic cord chafer in the axial direction is 0.5 to 0.8 times as high as the height $h_3$ of the upper end of the carcass reinforcing member.

6. The reinforcing structure as claimed in claim 1, wherein the angle of the carcass reinforcing member cords is 10°–50°, and preferably 20°–40° with respect to the ply cord of the carcass main portion near the height $h_4$ of the upper end of the inner turn-up portion of the metallic cord chafer in the axial direction.

7. The reinforcing structure as claimed in claim 1, wherein the angle of the metallic cord chafer in the outside of the axial direction of the tire is 40°–80°, and preferably 50°–70° with respect to the turn-up carcass ply cords near the height $h_4$ of the upper end of the turn-up portion of the metallic cord chafer in the axial direction.

8. The reinforcing structure as claimed in claim 1, wherein the angles of both the metallic cord chafer and the carcass reinforcing member cord are arranged in the same direction with respect to the radial direction of the tire.

9. The reinforcing structure of claim 1, including a soft rubber buffer on the axial inner side of the carcass interposed between the carcass ply and its turn-up portion, said buffer extending upwardly from the bead core in the radial direction.

10. The reinforcing structure of claim 9, in which the buffer gradually decreases in thickness toward the side wall of the tire.

11. The reinforcing structure of claim 1, in which the radial height of the lower end of the carcass reinforcing member is 10 to 15 mm above the bead base.

12. The reinforcing structure of claim 1, in which the rubber of the carcass immediately radially outward of the bead core is of no greater hardness than the remainder of the carcass.

* * * * *